April 17, 1945.  B. W. FREEMAN ET AL  2,374,089
HEAT MARKING APPARATUS
Filed Dec. 30, 1940   9 Sheets-Sheet 1

Inventors
BENJAMIN W. FREEMAN,
LOUIS G. FREEMAN, JR.

Attorneys

April 17, 1945.  B. W. FREEMAN ET AL  2,374,089
HEAT MARKING APPARATUS
Filed Dec. 30, 1940  9 Sheets-Sheet 8

Inventors
BENJAMIN W. FREEMAN,
LOUIS G. FREEMAN, JR.

Attorneys

Patented Apr. 17, 1945

2,374,089

UNITED STATES PATENT OFFICE 2,374,089

HEAT MARKING APPARATUS

Benjamin W. Freeman and Louis G. Freeman, Jr., Cincinnati, Ohio; said Louis G. Freeman, Jr., assignor to Benjamin W. Freeman Application December 30, 1940, Serial No. 372,372

8 Claims. (Cl. 101—287)

This invention relates to mechanisms and apparatus for use in marking and ornamenting skins, leather, shoe parts, shoe uppers, and the like, by marking, either independently of or at the same time, or as part of a cycle of operations in which the work is also ornamented by the application or perforating or cut out patterns, and in particular is directed to dies and machines for applying markings to the work under the influence of heat, either with or without the simultaneous application of pressure.

Under one phase of the invention an impression is marked or placed upon the work under extremely light pressures, but this may be varied such that the resultant marking, instead of being a light pressure impression marking, may be purely a surface lineament, or an indentation, embossing, or in fact, any desired marking required.

In a co-pending application Serial No. 372,371 filed of even date herewith, in the name of Louis G. Freeman, Jr., one of the applicants herein, there are disclosed methods of marking and ornamenting the work, and the mechanisms and apparatus of the instant application are particularly designed for carrying out such methods.

Shoes are conventionally ornamented by the cutting out of ornamental patterns in the uppers thereof, or by the placement of designs of perforations therein. This ornamentation may be effected, either on a flat blank or on a fitted upper, either before or after it has been closed.

For various reasons, such as to facilitate subsequent operations and assembly of the ornamented blank or upper, or to complete an ornamental pattern by markings which do not penetrate through the work as in the case of a perforation, it is sometimes desirable to place self-effacing, or removable marks on the work, which marks may take the form of guide lines for stitching, as an outline upon one blank to indicate the position upon which another part is to be applied, as a guide line for various subsequent operations, or as stated, to form a permanent part of the complete ornamentation, part of which may or may not be formed by openings cut completely through the work.

It may be found desirable to place a stamped design on the shoe part for ornamental purposes, which stamped design may be formed by ink markings, or may be formed by the use of impression papers of various kinds, such as gold leaf, silver leaf, and the like. The marking may be formed by the burning, indenting, embossing, ironing, printing, shrinking, or the like, of a design into or on the surface of the work; in the event a marking material is used, the heat may be used to "set" the material in the work; and in such cases will preferably form a permanent part of the work, as distinguished from a guide line for subsequent operations.

An early example of a combined marking and perforating operation will be found in the patent to Lupien, No. 1,689,633, dated October 30, 1928, wherein projections or protuberances are provided in a work support and plate, such that indentations will be placed into the work during a perforating operation. This type of combined operation, while tending to eliminate the need for two separate operations, was quite limited in its scope.

Later developments, of which there are many patented illustrations at the present time, are exemplified by the Freeman patent, Re. 21,321, dated January 16, 1940, wherein a method and apparatus are provided for accomplishing a marking of the work with ink, pigment or the like, and in which the need for heavy pressures such as might be required for certain forms of indentation marking, are eliminated.

It is known, broadly speaking, to ornament the work by the application of a heated marking medium, while at the same time cutting or perforating the work, and reference is made to the patent to Freeman et al., No. 1,937,195, dated November 28, 1933, which shows a die for this purpose. In that patent, heat is applied to the marking elements, in fact, the marking elements may be formed of an electrically heated resistance wire.

It is, however, an important object of the present invention to improve upon the method and structure of the invention patented in said Patent No. 1,937,195, by improving the methods of heating the marker, the structure of the heated marker, and the mode of using heated dies, such that operations are simplified, from the first step of heating to the final step of removing the finished work.

Just as the idea of combining indentation or impression marking with cutting and perforating represented an improvement over the independent, plural step methods of marking work as one operation, and perforating or cutting the work as a separate, independent operation—and just as the introduction of ink or print marking the work simultaneously with, or as part of a continuous cycle of operations in which the work was also cut or perforated, marked an important departure and a great improvement over the limited field of indentation marking, and over the use of separate operations to accomplish the finished result—so the method and apparatus of the present invention represents another step forward, and a further, improved departure from developments as they are known to date.

All of the advantages of marking with the aid of heat, whether by independent operations, combined operations, or marking to the exclusion of cutting, are retained in the practice of this invention, and added advantages are produced and the entire operation of handling the apparatus and the work greatly simplified and shortened.

Another object of the invention is to provide for variation in the nature of the mark applied to the work, e. g. to burn a mark into the work, permanently incorporate a mark in the work by the use of heat without necessarily burning, or apply the mark to the work purely and simply at the surface.

It is sometimes difficult to tell just exactly what does occur when a hot die is brought into contact with a piece of leather or other shoe upper materials. Where the heat, pressure, and duration of contact are great enough, the work is obviously burned. On the other hand, development work in connection with the instant invention has shown that it is possible, and entirely feasible, to apply a coloring medium, or an ink to the work under the influence of heat and obtain a permanent marking. The action in this case is in the nature of ironing, the coloring medium being actually ironed into the fibers of the material.

Again without even using a coloring material, and tests have shown that the same results are obtained with the use of a color medium, the application of a heated die to the work apparently causes a change in the fibrous condition of the work, akin to shrinking the fibers, thereby producing a mark. It is possible with a very light contact, merely sufficient to produce a surface engagement of the work and heated die, to produce a readily descernible mark which is wholly on the surface of the work, substantially in the same plane as unmarked portions thereof.

That heat will produce markings in the work, even in the absence of applied color, and without burning the work has been shown by experiment, where heat was applied to one side of the work, and an unheated die applied to the other side of the work, the effect being that of heat transmitted through the work itself. As illustrative of developments along this general line, reference may be made to the patent to Richter et al., No. 1,642,172, dated September 13, 1927.

Included in the objects of the present invention is the adaptation of existing methods and apparatus designed for print marking and cutting operations to the employment of heat, wherein provision has been made for print marking and perforating without the use of heat in a conventional manner, with the use of heat under the novel provisions of the present invention, or for marking with heat to the exclusion of the known ink marking methods, all this with the mere adaption of existing structures.

In other words, an important factor to be kept in mind in connection with objects of the present invention is that just as the ink marking produced many advantages over the pure impression or indentation marking, enabling treatment of various kinds of work, of variable characteristics, thickness, color, and without limitations to the nature or extent of the design or pattern, etc., so, marking and impressing with heat offers similar advantages, and with the present invention, if the situation occurs during a given run of work in which the use of heat for marking does not fit in with conditions, then the printing medium can be resorted to, without any change in equipment, nor any hold-up in changing over from heat marking to cold print marking. The converse is also true.

Considered from a structural standpoint, the invention may occupy several phases: The desired results may be obtained by use of a self-contained die unit in which the marking elements may comprise a plate of metal, such as brass or steel mounted on a heat conducting base in which is contained a heating unit.

As a variation there may be provided a master die base comprising a plate or block arranged to secure the unit in a machine and a second plate or block resiliently carried thereby. Detachably secured to the second plate would be a block of heat conductive material which includes a marker plate, preferably formed of metal. This type of unit need not contain a heating element as such but may be heated in any convenient manner, remote from the work. As an example, the die might be heated by contact with a heater containing a heating unit, at such time as it is is not performing a marking operation, and by its contact when at rest, become heated. This type of heat supply is adaptable for all dies, whether they be of the "master" type or not.

It is recognized, that the use of heat, regardless of how applied to the work, or to any part of the apparatus, offers a problem of protection to an operator; a further object herein is to supply heat at points remote from the work support or work handling station, and to transmit such heat to the work automatically under mechanical control, without calling upon the operator to do anything that might involve danger.

To the attainment of the foregoing and other objects which will appear as the description proceeds, reference may be made to the accompanying sheets of drawings, in which.

We have shown our invention in an embodiment such as is described and illustrated in U. S. Letters Patent No. 2,241,398 to B. W. Freeman, dated May 13, 1941.

Reference is hereby made to said patent as to all matters not involving the application of heat. It is to be understood, however, that the application of the invention to this particular machine is but illustrative.

Figure 1:
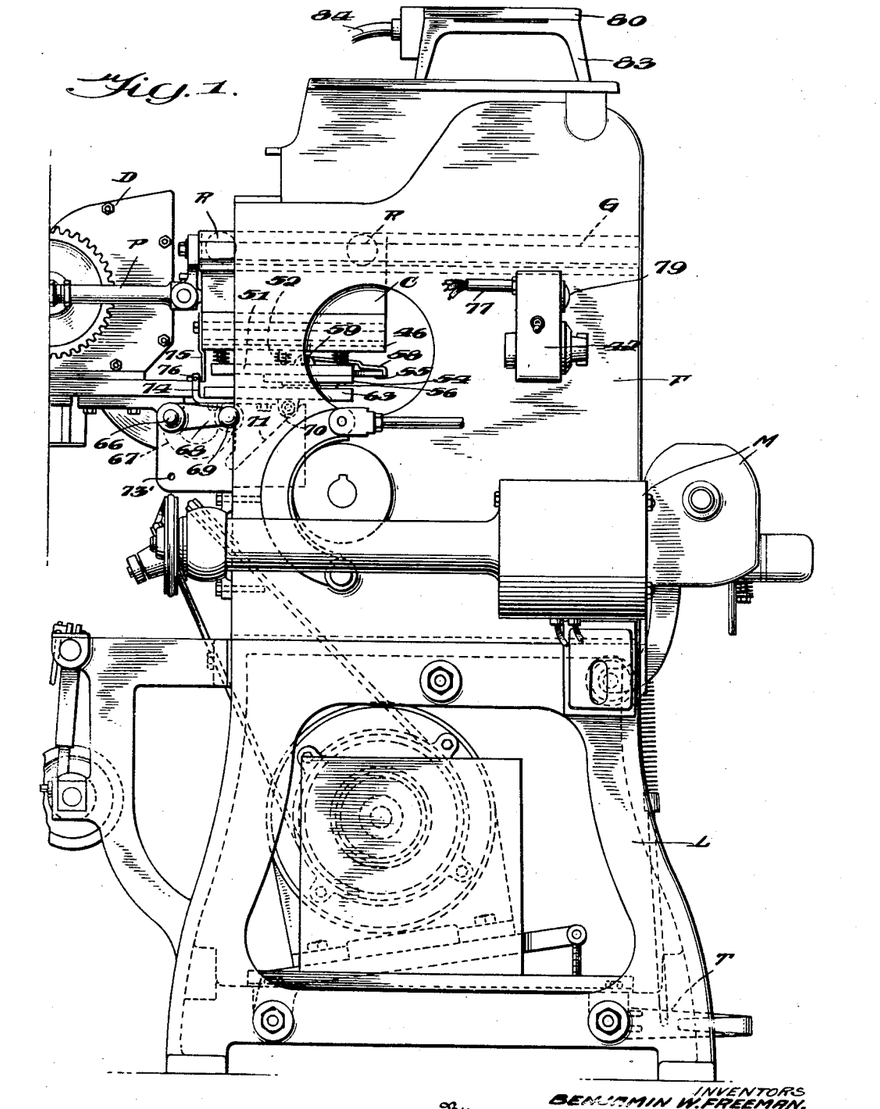
Fig. 1 is a vertical side elevation of a combined marking and cut-out machine, to which phases of the invention herein are applied.

It will be observed that the machine depicted in Fig. 1 comprises generally a frame F mounted on a stand or supporting legs L. Slidably mounted within the frame F, which functions as a housing for various operating parts, is a die carriage C, having rollers R which act to guide the carriage C along a track or guideway G. A driving mechanism D at the rear of the machine is connected by a pitman P to the carriage C, serving to move same from its innermost or rear position (shown in Fig. 1), to a forward or work ornamenting position at the front of the machine (see Fig. 6). Also housed within the frame F, at the forward or front part of the machine is a work supporting plunger S (Figs. 4 and 11), upon which the work is placed in a position of alinement with the outer or operating position of the die. The general operation of the machine is as follows. With the die carriage in its rearmost position (Fig. 1) and a die supported on the under side of the carriage C, the operator places work upon the work supporting plunger and steps on the treadle T. Treadling the machine causes the carriage C with its die to move forward, and as the carriage reaches its outermost position over the work supporting plunger, the plunger moves relative to the die on the carriage C, the work is ornamented, and recedes from the die, which with its carriage, then returns to its inner position in the frame F, permitting an operator to replace the work and present a fresh piece. During the movement of the die and die carriage from inner to outer position, marking material may be applied to the marking elements of the die, and intermittently at some stage in the cycle of operations, or constantly, as will hereinafter appear, heat is applied to the marking elements of the die, whereupon the marking operation can be effected during the aforesaid relative movement between the work supporting plunger and the die.

One phase of the invention is particularly illustrated in Figs. 1 to 6, and the process or mode of utilizing heat for marking is therein exemplified by a resiliently mounted, electrically heated plate, to which is secured the marker plate itself, in face to face contact. The mounting for the heating plate is in turn resiliently mounted on a base plate which forms the means of securing the complete unit in the machine. The base plate also may mount suitable plug connections for the heating unit. Thus there is provided a unti in which the marker, the heater, and the other elements of the die are all self-contained, and the unit is ready to be plugged into an electric socket in the machine.

Figures 2, 3, 3A:
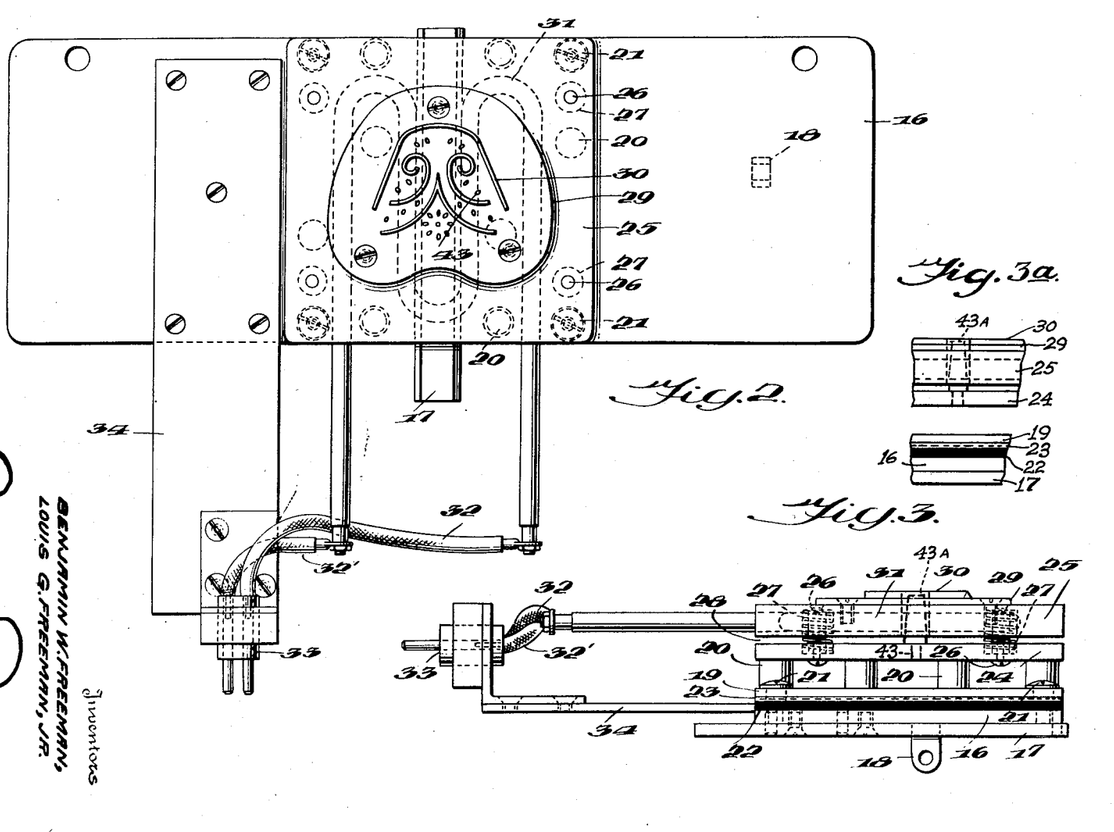
Fig. 2 is a plan view of the heating die in which the heating element is part of a self-contained unit.
Fig. 3 is an end elevation thereof.
Fig. 3a is a fragmentary side elevation of Fig. 3.

Specifically, this die comprises a mounting plate 16 to which is secured the usual gib 17, and the upstanding ear or locating lug 18, both of which are conventional items for securing or mounting a die unit on the die carriage of this ornamenting machine. A die block or base plate 19 of steel or other suitable material, and to which are rigidly secured a series of posts or sleeves 20, is carried on the supporting plate 16 by means of headed screws 21, upon which screws the plate or block 19 is free to slide.

Interposed between the base block 19 and the mounting plate 16 is a block of rubber or equivalent medium 22, which in effect forms a yielding or resilient backing for the block 19. This resilient material 22 may be insulated from the heated parts of the die, and from the block 19, by suitable insulation such as a sheet 23 of asbestos, or the like. Interposition of insulation between the die block 19 and the supporting elements or mounting for the die is effective to prevent dissipation of heat from the die to the machine proper, as well as minimizing deterioration in the resilient medium 22.

A second block or plate 24 is carried by the supporting sleeves 20 in rigidly spaced relation to the plate 19, whereupon the two plates 19 and 24 with the sleeves 20 form in effect a complete die block, which, except for reasons of economy, lightness in weight, and analogous reasons might be a solid slab. The plate or block 24 forms the direct supporting medium for the die member 25, to which are rigidly secured headed studs or screws 26, encircled by springs 27. The headed studs 26 extend through the second block or plate 24, and the springs 27, being seated in appropriate recesses in the member 25 as well as in the second plate or block 24 are thus operatively interposed between the member and plate and serve normally to space the member 25 from the block 24, providing a clearance or air space 28 for purposes hereinafter described. Upon application of pressure to the die, in normal use thereof, the studs or screws 26, sliding through the plate or block 24 permit the die member 25 to yield, and to be returned by the springs 27 upon relief of pressure.

The marker comprises a plate 29 formed with marking ribs or protuberances 30, which plate is either suitably secured, or made integral with the die member 25, in such manner that there will be a direct path for conductivity of heat between the member 25, the plate portion 29, into the ribs or protuberances 30, i. e. by the face to face contact.

A suitable electric resistance heating element 31, or other equivalent means of supplying heat to the marker 29—30 is positioned within the die member 25, this element 31 being connected by leads 32, 32' to a suitable plug 33, which may be mounted in any convenient manner in the die assemblage. As illustrated, a bracket 34, secured to the mounting plate 16 serves as a means for supporting and accurately locating the plug 33.

In operation, when the die is initially inserted in the machine, the plug 33 will mate with a suitable socket, preferably mounted in the machine proper, and it is preferred that the plug-socket connection will be completed at the time the locating lug 18 and other conventional die positioning elements reach their final position.

It is obvious, however, that any convenient plug and socket connection, whether in the machine and die, or not, may be utilized if conditions warrant, the main desideratum being that the die is constantly heated in all operative positions of the die and die carriage, so long as the die is secured in the machine.

Figure 4:
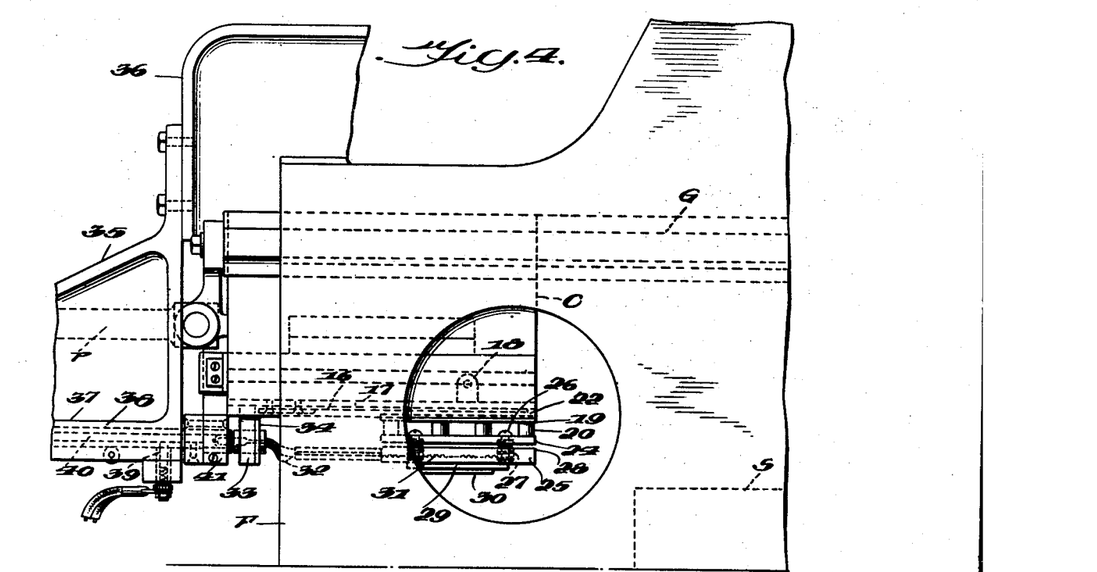
Fig. 4 is an enlarged fragmentary side elevation of the machine of Fig. 1, illustrating the die of Fig. 2 mounted therein at one position in its cycle of operations.
Figure 5:
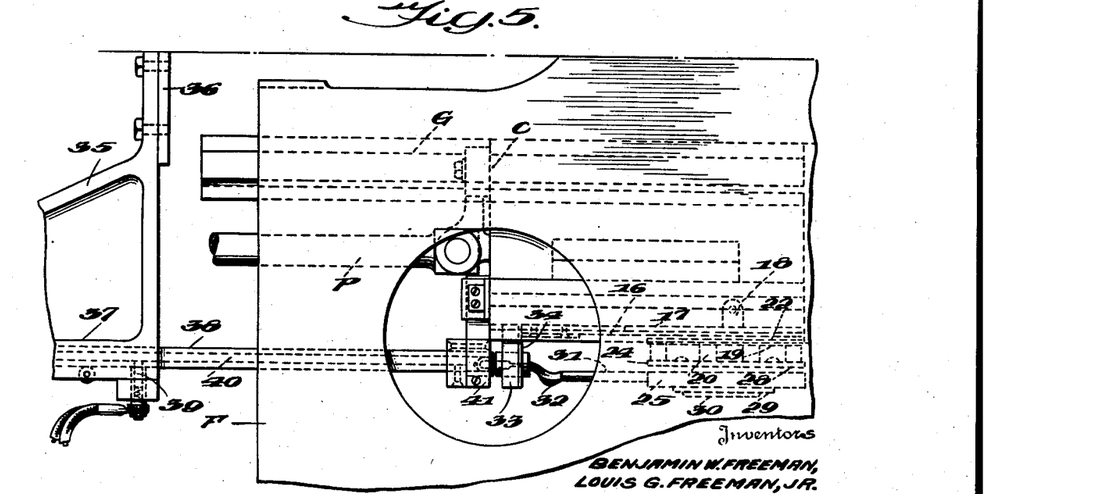
Fig. 5 is a view similar to Fig. 4 but illustrating the die in a different operative position.
Figure 6:
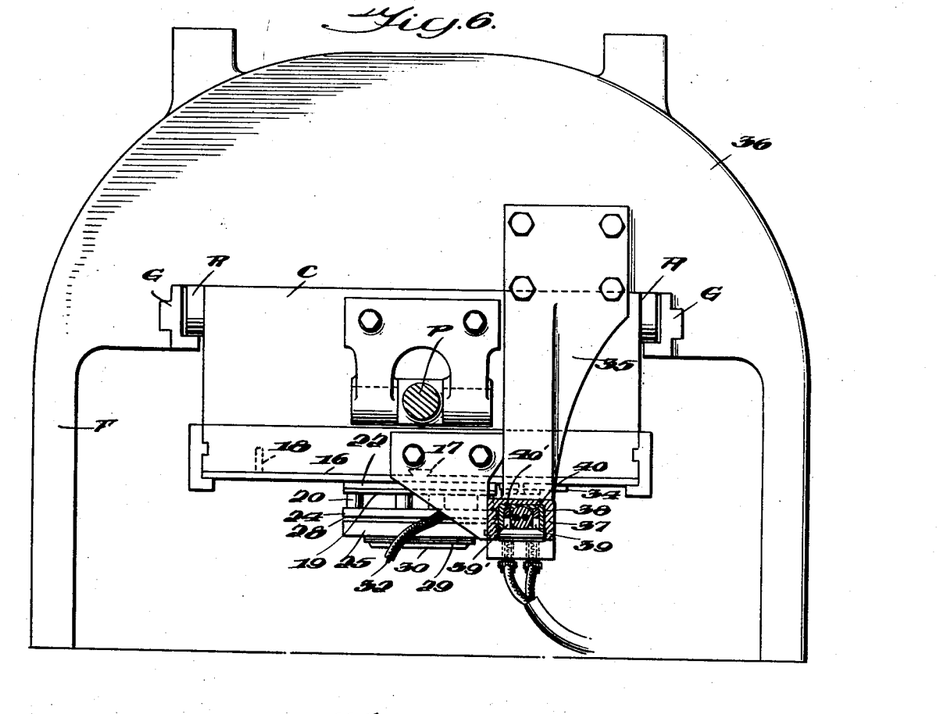
Fig. 6 is an enlarged fragmentary rear elevation of the machine, particularly in section, showing the same die and electrical connections therefor.

In the machine illustrated, the die is mounted upon a carriage which slides from an operative position with respect to the work at the front of the machine to an inoperative position at the rear of the machine, to permit replacement of the work between operations, and thence again to the front of the machine where the ornamenting operation occurs; hence it will be evident that some means must be provided in the nature of a flexible connection between the movable die and die carriage, and a fixed source of current. One mode of caring for this condition is illustrated in Figs. 4, 5, and 6, wherein the machine frame F has mounted thereon a bracket 35, preferably secured to the conventional cover plate or guard 36. This bracket is formed with, or mounts a sleeve 37, within which is telescopingly mounted a buss bar holder 38. A pair of brushes 39, 39' are secured to the sleeve 37, and connected by suitable leads to a source of current. The buss bar support 38 carries a pair of buss bars 40, 40', properly insulated from each other, and these buss bars 40 are positioned such that they always contact the brushes 39 regardless of the position of the die carriage. It will be seen that they are connected to the die on the die carriage by the medium of a socket 41, into which the plug 33 will be plugged, when the die is in position.

While the arrangement just described is a practical, preferred embodiment, it is obvious that other types of flexible connections or extended leads might be substituted, in machines not carrying this particular equipment.

The operation of this form of the invention will be readily apparent. The die is placed in the die carriage C of the machine in a conventional manner, and is secured in place with the plate 16 against the under surface of the carriage, the dove-tail wedge or gib 17 inserted in a mating groove provided for it in the under surface of the die carriage, and the lug or locating ear 18 co-operates with locking elements of the machine, to securely lock the die in its proper, alined, operating position. In so placing the die, the bracket 34 positions the plug 33 in alinement with the socket 41 and a connection therebetween is maintained until such time as the die is removed. As the die carriage slides from inoperative or rearward position within the machine to an operative or position of alignment at the front of the machine, the electrical connection between the die and the source of current is maintained, due to the telescoping relation between the buss bars 40 in the support 38 and sleeve 37, and the brushes 39.

The resistance unit 31 being heated, keeps the marker 30 hot at all times, (a) rheostat, multiheat switch, or the like, being used to control the heat and accommodate varying conditions. Such controls are conventional and illustrated but diagrammatically at 42.

The air space or clearance 28 between the die member 25 and the block 24 serves several purposes. Obviously it will act as an air insulator to some extent between the heated portion of the die and the remainder of the unit. But since this die is also well adapted to embossing operations, requiring a certain amount of pressure as distinguished from ordinary printing work, the resilient mounting 27 for the die member 25, plus the clearance 28, serve to provide a brief dwell. That is to say, after the marker 30 has contacted the work, there will be a brief dwell while the support or body portions of the die unit catch up to the die member 25, and take up the clearance, this dwell carrying over until the parts have again separated, the entire distance of the clearance 28. The resilient mounting 22 somewhat enhances this dwell, and additionally functions to provide the necessary yielding pressure for marking purposes when the die member 25 bottoms against the block 24. It follows, of course, that the dwell exists until pressure between the work and the die is relieved.

In order to simplify the disclosure and confine the description as far as possible to the novel features of the invention, no details of cutters or tubes, mountings therefor, stripping mechanism, and the like, have been illustrated in this form of invention, it being a self-evident fact that if it be desired to use this type of die with tubes or cutters, the die may be readily construtced in accordance with teachings of the Freeman patents mentioned above, for example, Patent No. 1,937,195. The design of the cutters would naturally conform to the design of the markers, and in Fig. 2 a series of perforating tubes are diagrammatically illustrated at 43, in openings 43a solely for purposes of illustration.

It will be appreciated, of course, that the pattern design of a die, be it formed by marking protuberances, cutting elements, or combinations of both, will vary for every different style of shoe, and when the particular run of shoes is completed, the die will normally be discarded. This is an expensive proposition, and if it were necessary to discard the entire die assemblage, including the built-in heating elements, the cost would be still greater. To avoid this waste, as well as reduce initial costs, another feature of the present invention contemplates a master die base or assemblage which is arranged for attachment in the machine, and to which is detachably secured a resiliently mounted heated die member having secured thereto a marker plate in the same manner as in the previously described form. However, in this construction all rubber and other intermediate structure is eliminated, and there is but the single resilient mounting between the heated die member and the master plate or block which will take care of the dwell and necessary embossing or other marking pressures.

Figure 7:
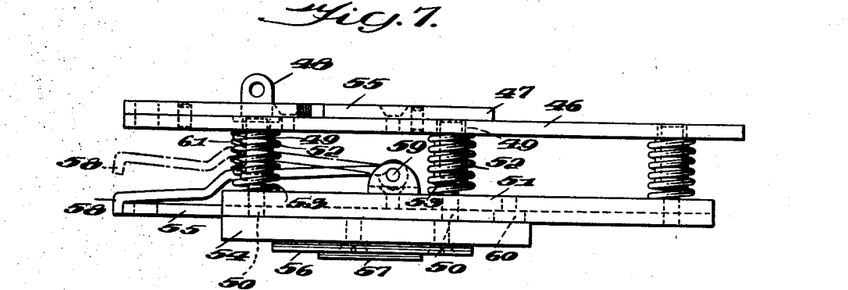
Fig. 7 is a side elevation of a different style of die usable in the machine of Fig. 1.
Figure 8:
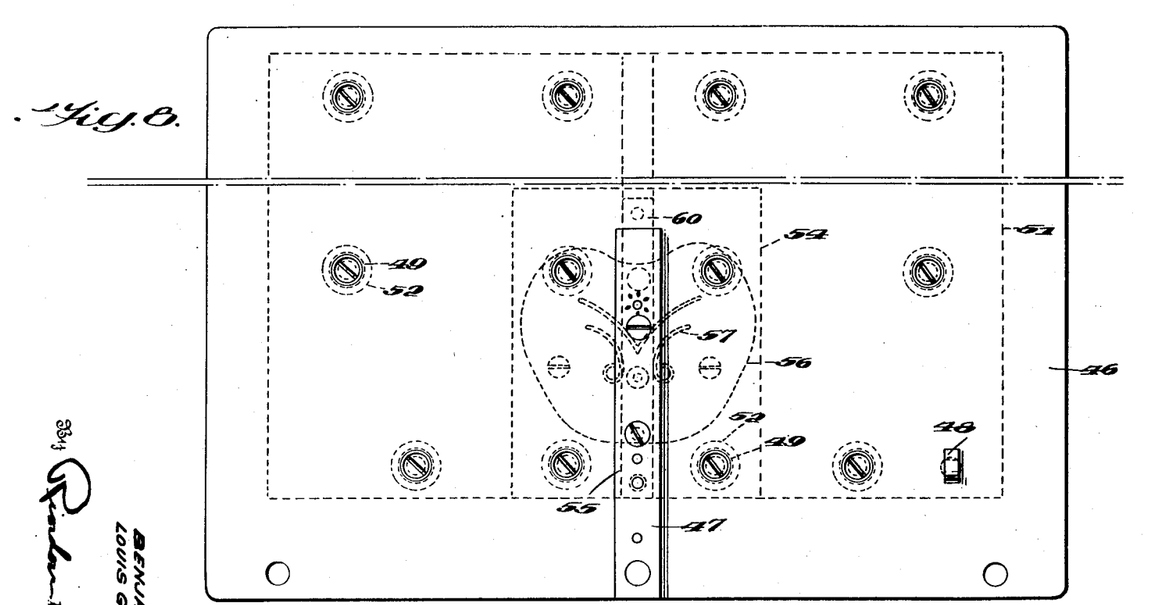
Fig. 8 is a plan view of the die of Fig. 7.
Figure 9:
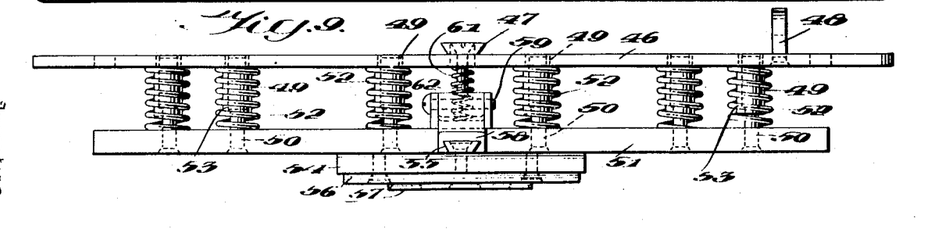
Fig. 9 is a front elevation thereof.

Such a die may take the form generally illustrated in Figs. 7, 8 and 9, which illustrate a die assemblage of the "Master" type utilizing a mounting plate 46 provided with a gib 47 and a locating lug or upstanding ear 48, by means of which the die assemblage may be secured to the die carriage C. A series of sleeves 49 are rigidly mounted on the plate 46 to serve as guides for a corresponding series of pins or studs, which are rigidly secured to the master die block 51. Springs 52 encircling the sleeves 49 serve normally to keep the block 51 spaced from the mounting plate 46. The plate 46 and the master die block 51 are kept from separating completely by forming the studs 50 with large diameters terminating respectively in shoulders 53, and in forming the sleeves 49 with reduced diameters, each forming an inwardly directed shoulder engageable with the respective shoulders 53 to limit the relative movement between the studs 50 and the sleeves 49. The marker proper, in this phase of the invention, takes the form of a removable insert having a gib or dove-tailed wedge 55 by means of which it may be secured to the master die block 51 in a manner somewhat similar to the mounting of the supporting plate 46 to the die carriage through the gib 47, or for that matter to the attachment of the plate 16 (Figs. 2 to 6), to the die carriage through the gib 17.

If it is desired to utilize an insert having a self-contained resistance unit for heating purposes, then a block such as the die member 25 with its heating elements 31, and its marker unit 29—30 may be provided to the exclusion of the remainder of the die assemblage illustrated in Figs. 2 and 3, i. e., by eliminating the resilient mountings 27 and 22, and the supports therefor, and substituting in their place a single gib 55 which will permit ready utilization of the member 25 with associated parts in the master arrangement comprising the die block 51 and the resilient mounting by means of which said block is carried by the supporting plate 46. This resilient mounting, therefore, permits the elimination of all rubber, asbestos, springs and other intermediate structure, substituting but a single resilient mounting between the heated member and the master supporting plate, and this resilient mounting is of a size, strength and proportion sufficient to care for necessary pressures for dwell and marking. The clearance or spacing between the block 51, and the supporting plate 46 will normally provide sufficient air insulation to check undue transmission of heat to the plate 46 and the die carriage C.

But a preferred form of construction, providing the utmost in structural simplicity, a minimum of expense occasioned by discarding of expensive die assemblages, and one in which costs of construction, labor, heating and operation are at an absolute minimum is best exemplified by an arrangement in which a die assembly, while retaining the "Master" features just described, employs no self-contained heating unit, and a machine in which many dies may be used interchangeably is equipped with a heat supply for any and all dies.

The die of Figs. 7, 8 and 9 is well adapted to this purpose, and it will be readily seen in lieu of the selfheated block or die member 25, a solid member 54, made in the form of a removable insert, and having the gib 55, may be secured by such gib to the master die block 51. Secured to the member 54 is a marking plate 56 upon which are formed or secured marking ribs or protuberances 57, and it will be evident that the insert comprising the elements 54, 55, 56, and 57 may be readily removed and replaced without in any wise disturbing the master assemblage, just as would be the case if the block 25 with its marker 29—30 and heating element 31 were provided with a gib for attachment to and removal from the master assemblage. But the member 54 with its marker elements involves practically no cost, other than the formation of the marking protuberances, which would have to be provided with any die, and hence when discarded the shoe manufacturer has disposed of the very minimum possible, and need replace only the marker proper.

It is desirable to provide some means for securing the insert, be it of the type shown in Fig. 9, or the block 25 of Fig. 3, against dislodgement or other movement relative to the master assemblage, and to this end, a latch 58 may be pivotally secured, as at 59, to the master die block 51, in a position such that its outer or hooked end may be placed over the end of the gib 55, which is preferably extended for that purpose. In other words, when the marker insert comprising the member 54, the gib 55, the plate 56, and the protuberances 57, is in its proper position, the latch 58 will be dropped over the end of the gib 55 and holds the insert in its properly located relation to the master assemblage.

The slot or dove-tailed guide in which the gib or dove-tailed wedge 55 rides, is blocked by a stop lug 60 which engages the rear or inner ends of the gib 55, serving to limit inward movement of the insert, as well as to locate the position thereof. Since the gibs 55 will be identical for all inserts, the position of an individual insert will always be the same as that of the insert which it replaces. Of course, the dove-tailed guide or slot itself for the gib 55 could be stopped at the desired point, and the block 60 rendered unnecessary, but it is less expensive to machine the slot entirely across the face of the master die block 51, and then plug it up with the block 60 at the desired point. Incidentally, this arrangement makes it possible to vary the inner limit of a given set of inserts should same be found desirable for any reason.

The latch 58 normally will tend to assume a latching position by its own weight, where the die is suspended from above, as in the illustrated embodiments, but in order to insure positive action, regardless of whether the die operates downwardly, or is reversed, and works upwardly, a spring 61 is positioned between the top side of the latch and the under side of the supporting plate 46, a guide pin 62 being secured to the latch to serve as a guide for the spring and to hold the spring in place.

In the operation of this form of die, heat will be supplied to the marking protuberances from any convenient source, examples being hereinafter described, and the die is ready to operate. The springs 52 being properly proportioned, and the clearance between the lower ends of the sleeves 49 being suitably proportioned, the resilient mounting of the master assembly functions to provide the necessary yielding pressure for embossing and marking purposes, as well as to provide the necessary dwell for embossing purposes, and also to position the marker at the proper location relative to the conventional ink applying roll, or equivalent medium, such that it is unnecessary to move the roll for each ink applying operation.

It will be understood, of course, that the various forms of die hereindescribed, function with and operate in the machine as described at the beginning of this specification, in a manner generally the same as though no provision for heating the marking elements were made at all. That is to say, where it is desired to place a mark on the work purely by the use of heat, the ink applying mechanism of the machine need not function, but where as would usually be the case, it is desired to apply a color medium under the influence of heat, then the ink applying mechanism will function in its normal manner, and the heat will have the effect of "setting" or "ironing in" the coloring material to form a permanent mark.

If an operator wants to change an insert quickly, without cooling, or to remove a self contained die, while hot, a convenient tool such as a small crank or hook may be used, and the die perforated for the purpose.

Figure 15:
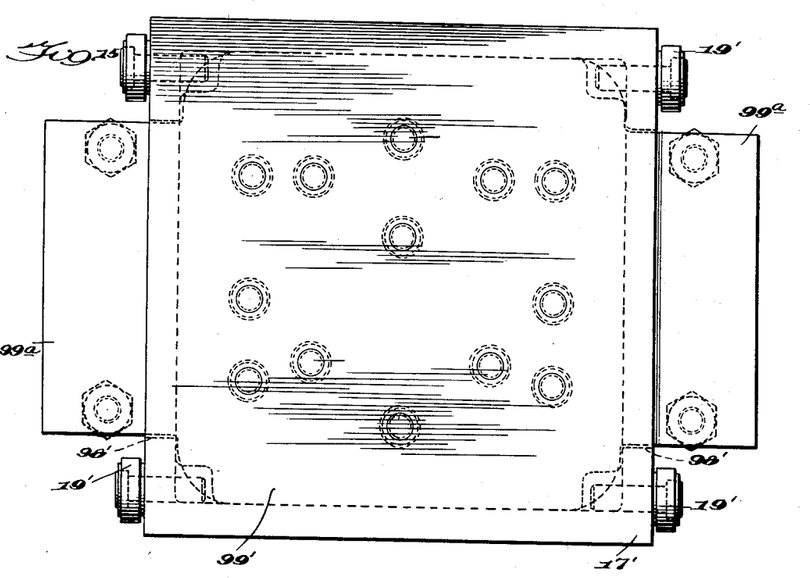
Fig. 15 is a top plan view of a die carriage illustrating the pressure applying member.

What has been said about the use of cutters in conjunction with the marking with heat, when discussing the first mentioned form of die herein, is equally applicable to the subsequently described forms of die, whether they carry their own heating means or not. As a matter of fact, it is contemplated that the dies used heretofore solely for purposes of marking with ink, as part of an operation in which cutting also occurred, may be used with equal facility in the organization about to be described. Examples of such dies will be found in the co-pending application of Benjamin W. Freeman resulting in Patent No. 2,244,613, granted June 3, 1941, in the Freeman Patent No. 2,183,038, dated December 12, 1939, and in fact in almost any die structure heretofore used for combined operations involving print marking. In 2,183,038 a relatively complicated die is shown. For a simpler die structure Patent 2,241,398 refers to Reissue 20,294 of 2,047,198. Figs. 7 and 8 of this Reissue patent are reproduced here as Figs. 15 and 16.

In Patent No. 2,183,038 a relatively complicated die is shown. For a simpler die structure Patent No. 2,241,398 refers to Reissue 20,294 of 2,047,198. Figures 7 and 8 of the Reissue are reproduced here as Figures 15 and 16 in view of the fact of certain of the claims calling for no greater pressure than required for a surface contact, this being accomplished by the use of lighter springs such as shown at 95'.

Figure 16:
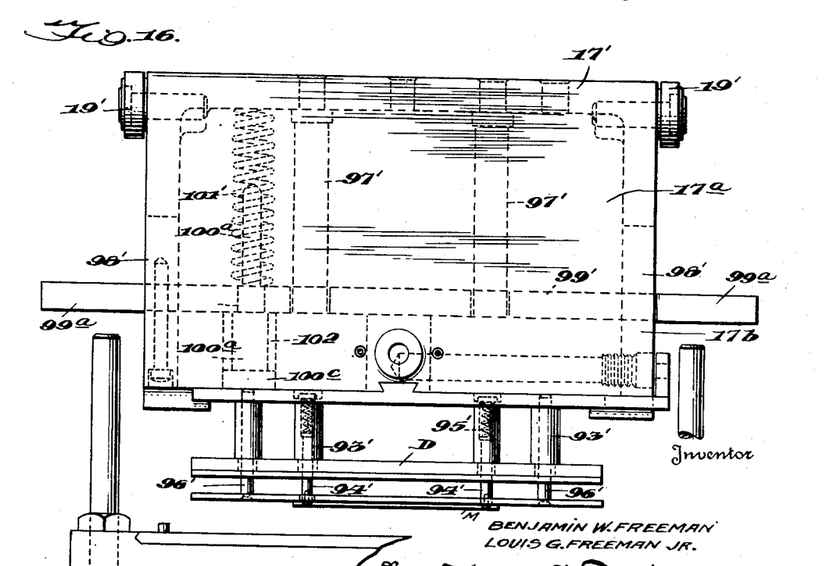
Fig. 16 is a front elevation of the carriage illustrating the stripper pressure mechanism and a die with its stripper plate mounted on the carriage.

As shown in Fig. 16, the die carriage 17' is built in the form of a hollow block or housing, having an upper box-like section 17ª, to the top or closed face of which are secured the rollers 19'. Extending across the lower open side of the casing 17ª is a thick plate 17ᵇ, which acts to close and complete the housing. The die unit D is detachably secured to the lower outer face of the block 17ᵇ in a known manner, as described in detail in Patent No. 1,990,597, dated February 12, 1935, and carries the usual stripper plate S, upon which may be mounted ink marking elements M. Conventional struts or sleeves 93' which space the cutter portion of the die from the die block or base, which is attached to the block 17ᵇ, are provided, and the plate S carries a series of upstanding pins which slide freely within the sleeves. Certain of these pins, indicated at 94', abut springs 95' within the respective sleeves. The springs 95' preferably are very light and only of sufficient strength to maintain the plate S slightly advanced from the cutters in the die D, it being understood that the plate S will be shaped as usual to permit passage of the cutting elements through or past the plate, to the work. The rest of the pins, indicated at 96', are free to slide, not only through their respective sleeves, but also through the die block, and are of such a length as to project slightly into the block 17ᵇ, when the ornamenting operation is taking place on the work.

Within the casing 17ª, and secured to the inner face of the top wall thereof, are a series of struts 97', the length of which is equal to the distance between the inner surface of such wall and the inner surface of the plate 17ᵇ. The purpose of these struts is to reinforce and back up the plate 17ᵇ, which will be subjected to extremely high pressures in normal operation. Any desired number of struts 97' may be utilized as will be found necessary.

The side walls of the casing 17ª will be cut out over a substantial distance front to rear, as indicated at 98'. Within the carriage 17' is a plate 99', which is freely movable insofar as the housing 17ª itself is concerned, and this plate is formed with extensions 99ª, which project through the cut-outs or openings 98', extending beyond the side walls of the die carriage or housing 17ª. A series of studs 100' extend through the plate 99' and are rigidly secured thereto. The ends 100ª of the studs which project above the plate are relatively small in diameter and act as guides for springs 101' which extend between the plate 99' and the top wall of the housing 17ª. The block or plate 17ᵇ is formed with a series of holes 102' and the studs 100' have their lower ends 100ᵇ projecting into these openings. At their extreme lower ends, the studs are enlarged to form heads 100ᶜ which are of substantially the same diameter as the openings 102', except for necessary clearance.

When the die D is secured in operating position on the plate or block 17ᵇ, the position of the pins 96' will be such that they can freely enter the respective openings 102'.

The plunger or work support 16' is provided with heavy, rigid upstanding posts 103' at each side, these posts being positioned to engage, in balanced relation, the extensions 99ª of the plate 99', when the plunger is in its upward position. The height of the posts may be adjusted in the plunger so as to engage the plate 99' before the marking element M contacts the work. Little or no pressure is required for ink marking and consequently when the marking element touches the work, it will operate, and this operation will be followed by the cutting out step, by means of the die D, as further relative movement takes place between the work support and the die carriage.

Of course the plunger does not move far enough to bottom the marking element on the die base as this would defeat the light pressure used in ink marking by bringing into play the full pressure of the plunger.

In the meantime, as the posts have moved toward the die carriage, the posts will act to push the plate 99' and stud 100' carried thereby away from the block 17ᵇ at the same time depressing the springs 101'. These springs are quite heavy, the number and strength thereof being proportioned to accord with the desired requirements.

With such a die, which does not supply its own heat, of course it would be a simple matter, although not very practical, to apply heat from almost any extraneous source. As a practical matter, however, it is almost essential that heat be supplied regularly, although intermitttently, from a regularly fixed source, and the intermittent heat offers the advantage of permitting a controlled application of heat to the die. The structure now to be discussed, comprises a heat supply station, accessible to the die, but remote from the operator, and automatic mechanism effective to carry the die to the station, while avoiding any question of danger to the operator. Figs. 1, 10, 11, and 12 illustrate such a mechanism, and while the die shown in these figures is of the type illustrated in detail in Figs. 7, 8, and 9, it is understood that the other types of die heretofore discussed may be utilized with equal facility.

In this phase of the invention, the heating is accomplished by the utilization of a heater in the nature of a plate to which heat is constantly supplied, and with which the marking protuberances of the die are placed in contact, when the die is in an inoperative position, so far as the work is concerned.

Figures 11, 12:
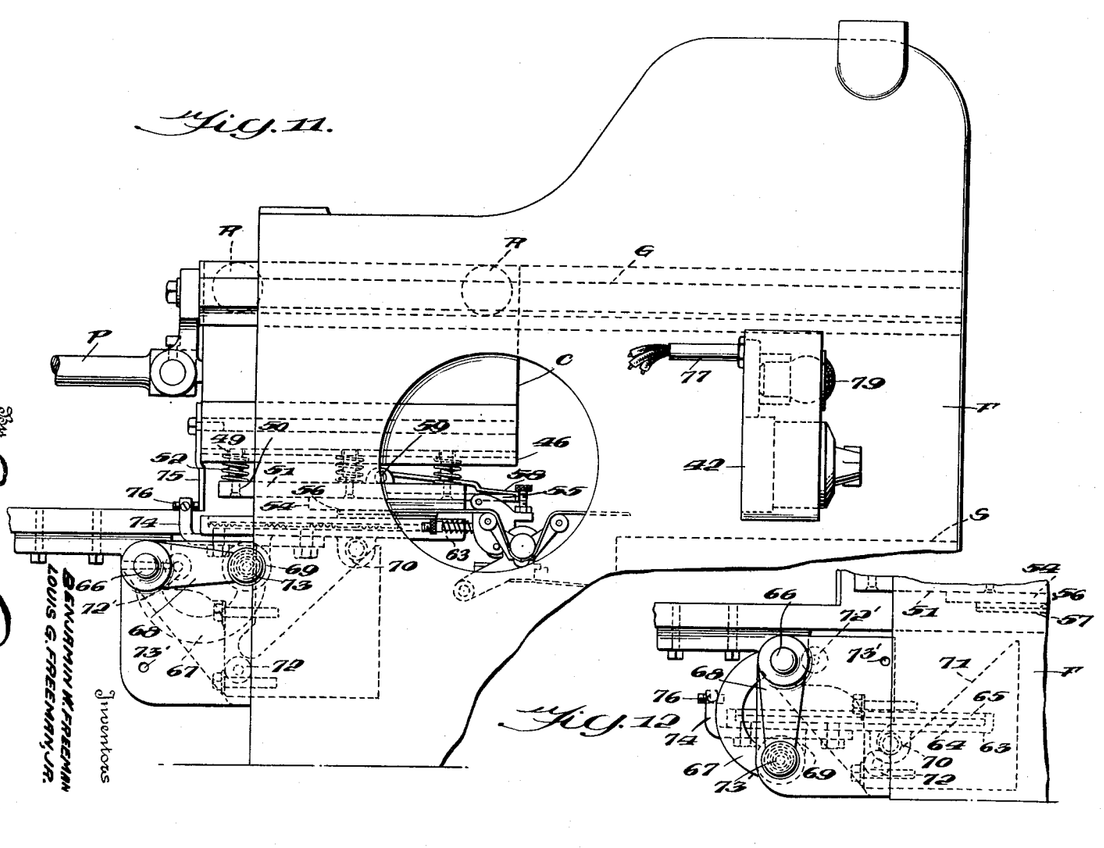
Fig. 11 is an enlarged fragmentary elevation of the machine showing the die of Fig. 7 in one operative position of its cycle, and illustrating a mechanism built into the machine, for supplying heat to the die.
Fig. 12 is a fragmentary elevation of the heat supplying mechanism of Fig. 11, showing the parts in a different position.

This plate, indicated at 63, consists of a receptacle in which is housed an electric resistance, heating unit 64 of conventional nature, suitably insulated, and covered across the top of the receptacle by a light, highly heat conductive plate 65, which forms a heat interchanger between the assemblage 63, 64, and the marking elements of the die. A shaft 66 mounted in the frame of the machine has secured thereon the ends of a pair of U-shaped arms 67—67, and at one end of the shaft is mounted a crank 68.

Figure 10:
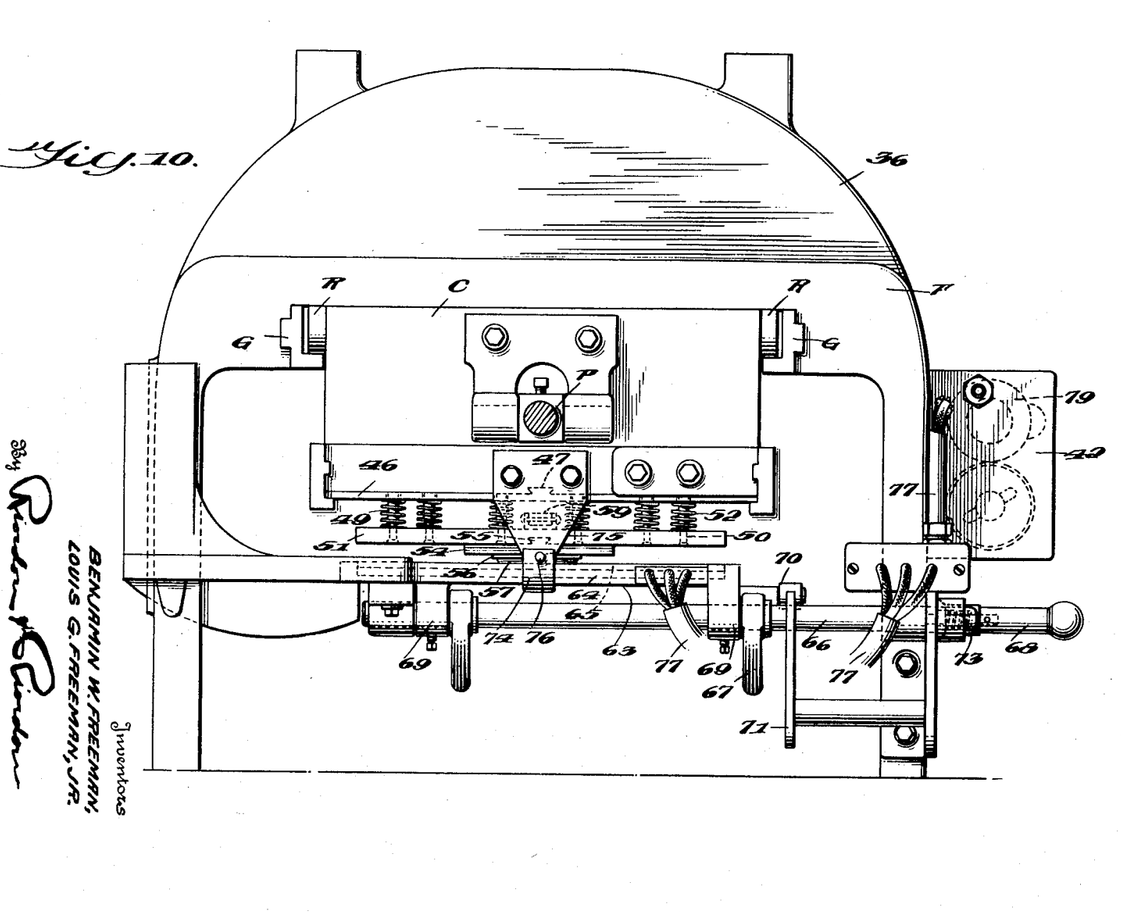
Fig. 10 is an enlarged rear elevation of the machine of Fig. 1, with the die of Fig. 7 in position.

The other ends of the arms 67 are pivoted as at 69—69 to the under side of the heating plate 63. Forwardly of the pivots 69 the plate is provided with a roller 70, illustrated as projecting from one side thereof to engage with and ride upon an inclined track 71. The track 71 is formed in a plate or bracket secured at 72 to the frame F of the machine (Fig. 10). The crank handle 68 is provided with a spring latch 73 including a stud or pin which enters one of a pair of perforations 73'—73' in a plate forming part of the side of the frame F such that the crank cannot be moved until the latch is released by pulling the handle outwardly, withdrawing the pin from the frame, thus permitting rotation of the crank with a corresponding rotary movement of the shaft 66 to which the arms 67 are pinned. There will be two positions in which the crank may be latched, one with the heating plate 63 in an operative position relative to the die carriage, and the other inoperative, the crank being latched in either of these two positions, by means of the upper and lower perforations 73'—73'. In Fig. 11, the position of the crank and the plate is such that the plate and die may contact each other as the die carriage reaches its innermost position in the machine, away from the operator and the work. In Fig. 12 the crank has been operated to move the plate 63 to an inoperative position remote from the path of the die and die carriage, in fact out of the way of all machine parts.

When in its upper or normally operative position, the relation of the pivot points 69 and the cam roller 70, including of course the track or camway 71, is such that the plate will be positioned normally with a slight downwardly and forwardly inclination, which will place the hot surface or plate 65 out of the plane of the path of the marking elements of the die, as the die travels rearwardly. This is to prevent any abrupt engagement of the marker with the hot plate, which during high speed operation might tend to injure the marker or damage some of the parts. In order to raise the plate, after the die has reached its rearmost position, into engagement with the marking elements, the plate 63 is equipped with a lug or finger 74, and the die carriage is similarly equipped with a downwardly projecting plate or flat finger 75. These two elements are arranged in alinement with each other, i. e. the lug 74 is in the path of movement of the plate 75 on the die carriage. Thus, just before the plate or finger 75 reaches its rear position by movement of the die carriage, it engages the lug 74 and moves it backward slightly, and in so doing causes the plate 63 to pivot about the pivots 69, thus tilting the plate upwardly into contact with the marking protuberances which by this time are positioned over the plate. An adjusting means 76 may be provided in the lug 74, to insure a proper contact.

Current may be supplied to the heating plate in any convenient manner, as by a cable 77 containing electrical conductors, which cable will connect the resistance unit 64 with the switch box of rheostat diagrammatically illustrated at 42, the latter being preferably equipped with a pilot light 79 to indicate operating conditions.

The functions and operation of the apparatus just described will be evident from the foregoing description, in that the die carriage, receding from the work to an inner position in the frame or housing F, will tilt the plate 63 from a downwardly inclined position into a substantially horizontal position contacting the marker, which then rests thereon. Heat will immediately be transferred by conduction to the marker elements 57. When the die carriage partakes of its forward stroke the heated marker will be brought into aligned position above the work and the work then treated in a conventional manner, the plate 63 in the meantime automatically tilting out of the plane of movement of the die carriage. Constant repetition of this cycle provides for an intermittent heating of the die, alternating with operations on successive pieces of work, and the heating is accomplished entirely under mechanical control, at a protected station remote from the operator, as well as from the work.

It will be understood that prior to the cycle of operations just described, the plate 63 will have been swung to its upper or operative location as illustrated in Figs. 10 and 11. When it is desired to eliminate the use of heat, and to operate the machine for printing or marking operations, with or without perforating but without the use of heat, the plate 63 will be swung to its lower, inoperative position as shown in Fig. 12, and the flow of current either reduced to a minimum, or completely cut off.

The structures, operations, and method have been thus far described primarily with respect to embossing or marking, without bringing in descriptions of perforating structures and operations, which are already known to the art, even in the type of machine to which the present invention is applied. This has been done largely for the sake of simplicity and purely as illustrative of the novel and inventive features of the present invention. As stated above, however, conventional dies of the type normally used in the hereindescribed machine, or of the type used with other cut-out and marking machines, wherein cutters and markers are both provided, may be used, either in the form of an insert for a master die assembly, or in lieu of a master die assembly, and the heating mechanism will function with equal facility. Other master die organizations may be used, that of Figs. 7, 8, and 9 being primarily illustrative.

When using a combination die in which cutting or perforating means are provided, it is of course desirable that the temperatures be such as not to affect the temper of the cutting edges. Where the marking edges are heated by a direct contact with the heater, as distinguished from a die having a self-contained heating unit, this temperature control is augmented by the very nature of the die itself, and advantage is taken of the fact that the hottest part of the marker is at the extreme edges of the marking protuberances, where contact is made. Normally these edges are positioned in a plane advanced with respect to the plane of the cutting edges, and the heat of radiation—there being no direct conduction—is not as great at the cutters, as in the marking edges.

Where heat is supplied at the base of the marking protuberances as in the self-contained die previously described, then a thermostatic, or other automatic control is contemplated. This control may be in the die unit, and will function to cut off or cut down the heat in accordance with operating conditions.

Figures 13, 14:
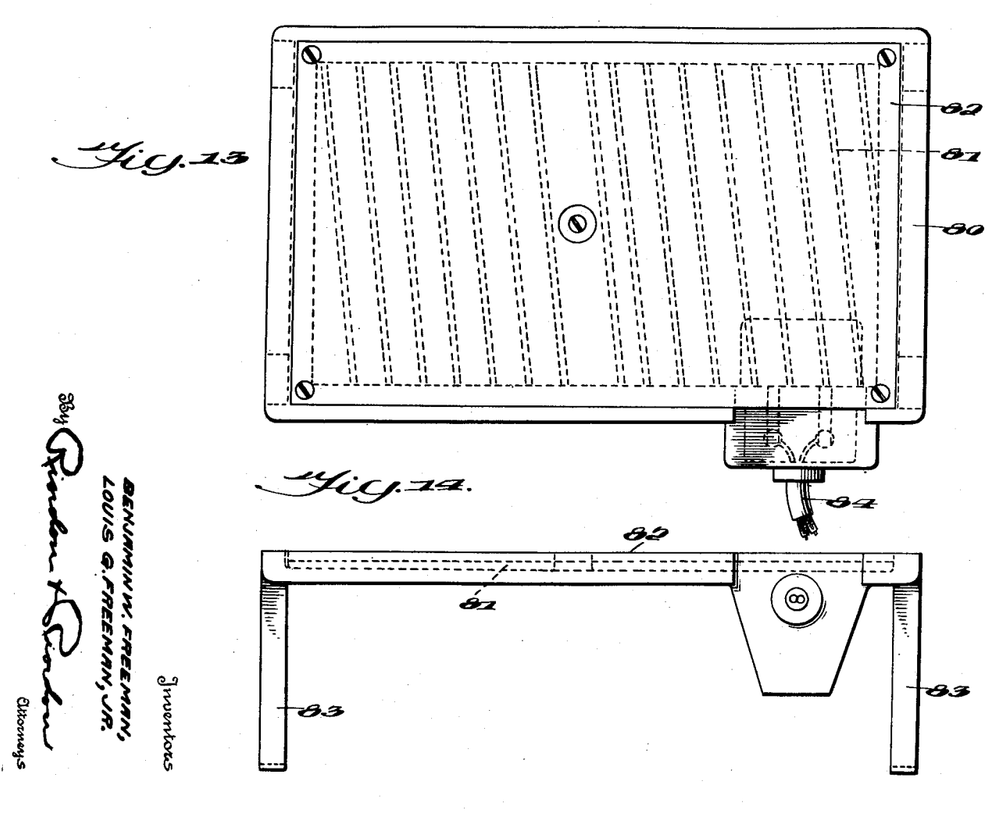
Fig. 13 is a plan view of a die preheating structure for use with the machine of Fig. 1.
Fig. 14 is a side elevation thereof.

In some instances it may be found desirable to preheat the dies, or inserts for a master die assembly, prior to actual placement thereof upon the die carriage in the machine. For example, wherein the nature of the work is such that an operator will be working in case lots, and will have to shift quickly from a die designed for one portion of the work, to a die designed for a different portion of the same run, or from rights to lefts, it will be desirable to preheat the dies, to avoid loss of time in the changeover. Obviously any available means or method of preheating may be utilized, but for purposes of convenience, and to provide equipment streamlined into needs of the present invention, it is contemplated as a part of the instant invention that the machine may be equipped with a preheater, illustrated in Figs. 1, 13, and 14. Structurally, this preheater is similar in nature to the heater 63, and comprises generally a metal receptacle 80 which houses an electric heating element 81, and includes as part of its organization a highly heat conductive top plate 82. The assembly may have legs 83 and as shown in Fig. 1, may very conveniently be located on the top of the machine without requiring any alteration of the machine frame. The legs may be utilized to bolt the preheater in place, or it may be secured at any other location convenient to the operator.

The junction box 42 may likewise be used to receive the leads in a cable 84, and a convenient switch for the preheater.

The operation of the various phases of the invention, and the practice of the method of marking with the use of heat has been explained as the description proceeded, and needs no detailed explanation here. Suffice to say that the equipment for heating the dies, in any form of the invention, can be applied to existing machines, or built into new machines, and can be used either in conjunction with, to the exclusion of, or eliminated in deference to the usual methods of ornamenting work by a combined marking and cutting operation.

These machines usually employ a backing medium such as paper, in order to insure a clean cut through the work by the perforating or cutting elements of the die, this backing medium also serving to protect the cutting elements of the die. The feeding mechanism for the backing material of paper or the like is illustrated in Fig. 1 in a diagrammatic form as indicated at M.

The heating attachments, in all forms of the invention will have no effect on the backing paper. When no cutting is performed, the paper feed mechanism may be stopped, to avoid wastage of paper, and when a cutting operation is performed along with or to the exclusion of marking, the paper may be fed in its normal manner. This applies regardless of whether a heated or an unheated die is used.

Among the features to be recognized as advantageous in the invention, are the fact that the marking elements are themselves heated, and heat transferred therefrom to the work, although as variations in the method, the heat may be transferred from a source of supply to the work, the main consideration being that heat is present at the point where the marker engages the work. The heat may be constantly supplied to the markers, as in the case of a self-contained heating unit in the die, or may be supplied intermittently as in the case of a heating plate built into the machine. In the latter case there will be no heat applied to the die during the marking operation, and the hottest point of the marker will be the marking edge.

In the case of a self-contained die, where heat is constantly supplied, the mean temperature as applied to the work will be comparable with that of the intermittently heated die, since the heat will have to pass through the shank of the marker, outwardly to the marking edges. With the intermittently heated die, it will be evident that the complete die structure does not get hot, thus permitting a reasonably quick change-over from hot to cold operations.

One important advantage which applies to all phases of the invention resides in the fact that hot or cold dies can be quickly interchanged and used without delay of waiting for machine parts to cool, and by use of a preheater, dies to be used with a heated operation, following some previous treatment can be kept ready without any waiting period.

It has been pointed out that the machines and methods may be used with either hot or cold dies, with or without ink or embossing compounds, and that the use of heat alone without any additional printing, embossing or coloring medium will produce a permanent mark which may be burned, or ironed, shrunk or impressed in the work without burning, that a marking medium may be applied to, and "set" by heat in the work—in other words the method is universal in its application and is applicable to all kinds of work.

There is no loss of speed of machine operation, because of factors heretofore recited, i. e. the method contemplates a constant speed for all kinds of work.

All parts, heating elements, die elements, preheater, etc. are readily accessible, and can be repaired, replaced and eliminated without in any manner rebuilding or remodeling the existing apparatus to which it has been applied.

The movements and operations of the die to and from a heating station, or with a self-contained heater are all automatic, and mechanically controlled; the operator need never touch the die except for replacement purposes at the beginning and end of a run of work. Where the die is heated extraneously, the heater is protectively located within the machine frame, remote from the operator.

The markings can be effected with variable degrees of pressure, but one important feature of the present method is that an impression mark can be obtained by the use of heat with an extremely light pressure, not exceeding that required for ordinary printing with ink, and heretofore practiced, as distinguished from heavy pressures normally required for indentation marking, and regardless of the pressures required for stripping, since stripping, in the apparatus hereindescribed, is effected by pressures created within the die carriage and transmitted to the work independently of the normal operation of the die.

The stripping pressure mechanism in the die carriage does not exert any pressure against the posts (Fig. 9) of the die during the marking operation but as the work supporting plunger S returns to its inoperative position the stripping pressure springs cause the pressure plate to be moved downward, exerting an even pressure against all of the posts 50 of the die. This pressure is exerted from the pressure plate in the die carriage head and is independent of the springs 52 of the master die holder. However, the pressure plate in contacting the posts 50 of the die cooperate in orienting the die block 51. If a piece of work of varied thickness is operated upon by the die it is possible that the die block 51 might be tilted or canted and bind itself in this position. This binding might be caused by the lightness of the springs 52 or the springs 52 might lose their strength from their proximity to the heated die. If the die should ever bind itself in this tilted position the cooperation of the stripping pressure mechanism in the head of the machine would orient the die immediately it leaves the work and is then in the proper position to contact over its entire area the heated plate while in its rest position and may contact over its entire area the mechanism for distributing the marking medium.

It will be understood, that not only is the method effective to cut without marking, to mark without cutting, or to both cut and mark the work, and to mark with or without the use of heat, with or without the use of an applied marking medium but that the cutting and marking may be accomplished simultaneously or successively in a continuous cycle, in any sequence and automatically.

An essential advantage inherent in the present method and apparatus resides, however, in the fact that regardless of the sequence of marking and cutting operations, it is possible to avoid a plurality of separate gauging steps for marking and cutting, thereby insuring that for one alignment of the work several operations may be performed.

The ornamenting operation, by the cutting, marking, or both, may be effected upwardly or downwardly, by movement of the work to the die, or vice versa, and the invention herein is applicable to these several ramifications of structure.

Since there are so many conceivable combinations of markings, with and without cutting, it is difficult to find a really descriptive, generic term to denote the result of an operation on the work.

The markings may include permanent markings designed to remain in the work, or temporary markings designed for guiding subsequent operations in the manufacture of the shoe. In the latter case the markings may consist of an ink which can be removed, or a light impression which, in time, is self-effacing. Combinations of both types of marking, with or without a perforated design might be placed in the work.

It will be understood, therefore, that the term pattern or lineament as used in this specification, and in the appended claims will apply to any treatment of the work, regardless of whether it is permanent, temporary, or combinations of both, or relates to contours, outlines, or designs formed by arrangements of perforations and/or markings which may not follow an outline.

Having thus described our invention, what we claim as new and desire to secure by Letters Patent of the United States, is:

1. In a machine of the class described, a work support, and a resiliently mounted marking die, means to move said support upwardly toward said die and below the path of travel of the die, a heating plate located at a point in the machine remote from the support, means to move said die from a work treating position adjacent said support to said heating plate, and means to move said heating plate upwardly into contact with said die.

2. In a machine of the class described, a marking die, an operating station having a work support, a heating station located laterally of said support having a plate to heat said die, means for guiding said die in its movement between said stations, means to move said die to said heating station, and from said heating station to said operating station, means to produce a contact between the work and the heated die to treat the work at said operating station, means to move said heating plate into contact with said die when the die moves into the heating station, and to move said heating plate to an inoperative position when the die leaves the heating station.

3. In a machine of the class described, a resiliently mounted marking die, an operating station for work treatment by said die, a heating station having a plate to heat said die, means for guiding said die in its movement between said stations, means to produce a contact between the work and the heated die at the operating station, means to move said heating plate into contact with said die when the die moves into heating station and to move said heating means to an inoperative position when the die leaves the heating station.

4. In an ornamenting machine having a work support, pressure applying means, the combination with a resiliently mounted marking die, a heating plate located at a heating station remote from the work support, means for guiding the movement of the die from the work support to the heating plate and for the return of the die to the work support, means to move said heating plate into contact with said die at the heating station, and means to effect contact between the marking element and the work with substantially no greater pressure than required for a surface contact, whereby to produce in the work a lineament consisting at least in part of a surface marking.

5. In an ornamenting machine having a work support, pressure applying means and control means therefor, the combination with a marking die, means to apply a pigment to said marking die, a heating plate located at a point in the machine remote from the work support to heat the marking element of the die, means for guiding the movement of the die from the work support to the heating means and for the return of the die to the work support, means for moving the heating plate into contact with the die, means to effect contact between the marking die and the work while under the influence of the supplied heat and controlled pressure substantially no greater than that required for a printing contact, whereby to produce in the work a lineament consisting at least in part of a heat-set pigmented surface marking.

6. In a machine of the class described, a work support and a marking die, means to effect relative vertical movement between said die and said support to apply said marking die to a work piece on said support, a heating means, and means to move said die laterally from a work treating position to said heating means whereby to heat the die intermittently between operations on the work, said die heating means comprising a heated surface disposed substantially out of the path of movement of the die, and means to effect a relative movement between said heated surface and the marking element of the die when the die is moved to the heating position.

7. In a machine of the class described, a marking die, an operating station for work treatment by said die, a heating station having a plate to heat said die, means to move said die to said die heating station, and from said heating station to said operating station, means to produce a contact between the work at said operating station and the heated die to treat the work, means to move said plate into contact with said die when the die moves into the heating station and to move said heating plate to an inoperative position when the die leaves the heating station, comprising a pivotal mounting for said heating plate, and a member projected into the normal path of movement of said die, for engaging by the die upon its entry into the heating station, and means to actuate said plate away from its die contacting position as the die leaves.

8. In a machine of the class described, a die, an operating station for work treatment by said die, a heating station having a plate to heat said die, means mounting said die for movement between said stations, means to move said die to said work heating station, and from said heating station to said operating station, means to produce a contact between work at said operating station and the heated die to treat the work, means to move said heating plate into contact with said die when the die moves into the heating station, and to move said heating plate to an inoperative position when the die leaves the heating station, comprising a pivotal mounting for said heating plate and a member projected into the normal path of movement of said die, for engagement by the die upon its entry into the heating station, means to actuate said heating plate away from its die contacting position as the die leaves, and cam track means for guiding said heater into and out of its die contacting position.

BENJAMIN W. FREEMAN.
LOUIS G. FREEMAN, JR.